(12) United States Patent
Davis

(10) Patent No.: US 9,500,467 B2
(45) Date of Patent: Nov. 22, 2016

(54) MANAGING A SOUND SYSTEM

(71) Applicant: LENOVO (Singapore) PTE, LTD., New Tech Park (SG)

(72) Inventor: Mark Charles Davis, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 181 days.

(21) Appl. No.: 14/339,279

(22) Filed: Jul. 23, 2014

(65) Prior Publication Data

US 2016/0025683 A1   Jan. 28, 2016

(51) Int. Cl.
*G01B 9/02* (2006.01)
*H04R 29/00* (2006.01)
*G01H 3/00* (2006.01)
*G01H 9/00* (2006.01)
*G01B 11/16* (2006.01)

(52) U.S. Cl.
CPC ........ *G01B 9/02* (2013.01); *G01H 3/00* (2013.01); *G01H 9/00* (2013.01); *H04R 29/007* (2013.01); *G01B 11/162* (2013.01)

(58) Field of Classification Search
CPC ..... G01B 9/02; G01B 9/02094; G01S 15/02; G01H 3/00; G01H 9/00; H04R 19/06; H04R 29/00; H04R 29/001; H04R 29/002; H04R 29/004; H04R 29/005; H04R 29/006; H04R 29/007
See application file for complete search history.

(56) References Cited

U.S. PATENT DOCUMENTS

| 5,133,017 | A | * | 7/1992 | Cain | ................. | G01R 33/3854 |
| | | | | | | 381/71.4 |
| 5,711,308 | A | * | 1/1998 | Singer | ................. | A61B 5/1076 |
| | | | | | | 600/559 |
| 2002/0076059 | A1 | * | 6/2002 | Joynes | ............... | G10K 11/1788 |
| | | | | | | 381/71.6 |
| 2008/0056724 | A1 | * | 3/2008 | Bakish | .................... | G01H 9/00 |
| | | | | | | 398/130 |

OTHER PUBLICATIONS

Zeev Zalevsky et al., "Simultaneous remote extraction of multiple speech sources and heart beats from secondary speckles pattern", Optics Express, Nov. 23, 2009 / vol. 17, No. 24.

* cited by examiner

*Primary Examiner* — Michael A Lyons
(74) *Attorney, Agent, or Firm* — Kunzler Law Group

(57) ABSTRACT

For managing a sound system, a method is disclosed that includes identifying a location for measuring sound, directing light from a light emitter to the location, determining a speckle pattern at the location based on data received from an optical interferometer, and adjusting a sound producer based on the determined speckle pattern.

20 Claims, 10 Drawing Sheets

MANAGING A SOUND SYSTEM

BACKGROUND

Field

The subject matter disclosed herein relates to audio generation and more particularly relates to managing a sound system.

Description of the Related Art

Media presentation systems and/or sound systems may be used a wide variety of scenarios. Typically, a sound system may be used to generate audio for one or more viewers of the media content.

In one example, a sound system may include audio generation hardware that transmits sound signals to one or more speakers. In order to balance a sound generated by more than one speaker, the audio generation hardware may instruct a user to perform an audio calibration procedure. The user may be instructed to move a microphone to one or more user identified locations. The audio generation hardware may transmit various sounds from the speakers and may adjust speaker properties based on audio signals received by the microphone at the various locations.

Requiring a user to perform this calibration procedure may be inconvenient for many users. Furthermore, as conditions of speakers change, or as the sound environment changes, the user may be required to frequently repeat the calibration procedure to maintain optimal sound production.

BRIEF SUMMARY

An apparatus for managing a sound system is disclosed. In one embodiment, the apparatus includes a light emitter and an optical interferometer. In another embodiment, the apparatus includes a location module that identifies a location for measuring sound, the location module directing light from the light emitter to the location. In a further embodiment, the apparatus includes a detection module that determines a speckle pattern based on data received from by the optical interferometer. In one embodiment, the apparatus includes a sound module that adjusts a sound producer based on the determined speckle pattern. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
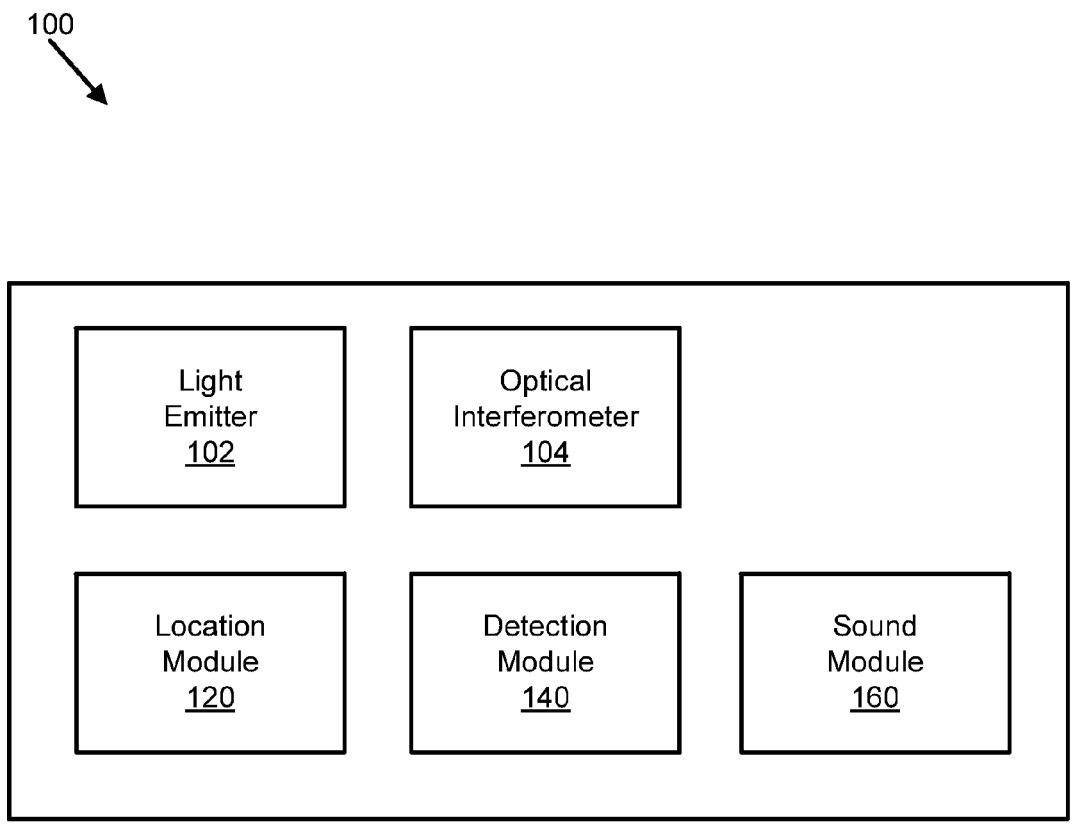
FIG. 1 is a schematic block diagram illustrating one embodiment of an apparatus for managing a sound system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an apparatus 100 for managing a sound system. In one embodiment, the apparatus 100 may include a light emitter 102, an optical interferometer 104, a location module 120, a detection module 140, and a sound module 160.

In one embodiment, the location module 120 may identify a location for measuring sound. The location module 120 may detect one or more objects in an immediate vicinity of the apparatus 100. The location module 120 may identify a class of one of the objects and may determine if the object is a person, or another object as one skilled in the art may appreciate.

In one embodiment, the location module 120 may determine a location of a human face. The location module 120 may receive imagery from a camera and may distinguish a human face from other objects. Based on detecting a human face, the location module 120 may identify a person at the location. In certain embodiments, the location module 120 may identify many people at their respective locations. Therefore, in one example, a room that includes multiple people viewing media content, the location module 120 may determine respective locations of the people in the room.

In another embodiment, the location module 120 may determine a location based on many people being identified at the location. Therefore, in one example, a group of people may be at a location. The location module 120 may distinguish one or more faces in the group of people and may determine a single location at a median, middle, or average point of the identified faces. Therefore, a single location may represent many people.

In one example, the location module 120 may receive imagery from a video camera and may determine one or more locations based on the imagery. In another example, the location module 120 may receive periodic still shot imagery from a camera and may determine one or more locations based on the imagery. In another example, the location module 120 may determine one or more locations based on movement being detected at the locations. For example, the location module 120 may communicate with mechanical or electronic devices to detect motion at or near the location module 120. The location module 120 may determine a location at the detected movement.

In another embodiment, the location module 120 may direct light from the light emitter 102 to the location. In one example, the light emitter 102 may include a laser. The light emitter 102 may use optical amplification of electromagnetic radiation as one skilled in the art may appreciate. The light emitter 102 may create a speckle pattern of electromagnetic light at the location.

The light emitter 102 may generate sufficient light such that a reflection of the emitted light may be visible at the location. The emitted light may be any range of frequencies as one skilled in the art may appreciate. For example, emitted laser light may be at a frequently that is not visible by a person. In another example, light emitted by the light emitter 102 may be at an intensity such that the light is not visible by a person, but may be visible by the optical interferometer 104.

In one embodiment, the location module 120 may determine many locations. For example, where four people are within range of the location module 120, the location module 120 may determine four locations associated with the four people. In this example, the location module 120 may direct light from the light emitter 102 to each of the four locations. In one example, the location module 120 may direct four light emitters 102 to respective locations. In another example, the location module 120 may alternate the light emitter 102 to each of the four locations sequentially. Of course, other numbers of locations may be used and this disclosure is not limited in this regard.

In one embodiment, the apparatus 100 may include the detection module 140. The detection module 140 may determine a speckle pattern at the location based on data received by the optical interferometer.

In one embodiment, the detection module 140 may use electronic speckle-pattern interferometry (ESPI) as one skilled in the art may appreciate. The detection module 140 may measure displacement and/or vibration of a physical deformation of material at the location. The detection module 140 may also characterize deformation of an object at the location based on movement of the speckle pattern. Movement of an object at the location may represent sound waves impacting the object. Therefore, the detection module 140 may determine representative sound waves that would cause the measured deformations, displacements, vibrations, or the like, at the location.

In another embodiment, the detection module 140 may communicate with an optical interferometer 104 to observe changes in the intensity of the speckle pattern. The optical interferometer 104 may observe the speckle pattern at any angle relative to the location and this disclosure is not limited in this regard.

In one embodiment, the detection module 140 may superimpose electromagnetic waves in order to extract information about the waves. In one embodiment, the optical interferometer 104 may implement homodyne detection, heterodyne detection, double path, common path, wavefront splitting, amplitude splitting, or other, or the like as one skilled in the art may appreciate.

In one example, observed changes in an object at the location may be caused by sound waves, or pressure waves, impacting the object at the location. Therefore, by observing physical deformation in the object at the location, and based on movement of the speckle pattern, the detection module 140 may reconstruct sound waves at the location.

The detection module 140, in certain embodiments, may determine frequency, phase, amplitude, or other electromagnetic wave properties of the speckle pattern. Properties of the speckle pattern may indicate microscopic deformations of a surface of the object at the location.

In another embodiment, the location module 120 may indicate to the detection module where location may be. In response to receiving the locations from the location module 120, the detection module 140 may direct the optical interferometer 104 to one or more of the locations. In one example, the detection module 140 may communicate with many optical interferometers and may direct respective interferometers to respective locations. In another example, the detection module 140 may measure speckle pattern at the locations sequentially, or in turn, or the like.

In one embodiment, the apparatus 100 may include the sound module 160. The sound module 160 may adjust a sound producer based on the determine speckle pattern. A speckle pattern, as described herein, may include, but is not limited to, changes in an electromagnetic wave, changes in amplitude, intensity, phase, frequency, or the like. A speckle pattern may include twinkling light, oscillating light, or any other detectable change in light returning from the location. The speckle pattern may or may not include light from other sources (e.g. not from the light emitter 102).

In other embodiments, the speckle pattern may not repeat. For example, where sound at the locations may cause deformations in a surface of an object at the location, the deformations may not be consistent with any repeated sequence of deformations. Therefore, although "pattern" is used, "pattern" does not necessarily indicate that the speckling repeats in any kind of pattern. "Pattern" as used herein may simply mean the sequence of properties of the electromagnetic waves reflecting off an object at the location.

In other examples, the speckle pattern may be limited to effects base on deformations of a surface of an object and may not include effects based on movement of the object as a whole. Therefore, although movement of the object as a whole may affect the speckle pattern, the speckle pattern may be limited to effects of the emitted light at a surface of an object at the location.

In another embodiment, the apparatus 100 may include the sound module 160. The sound module 160, may adjust a sound producer based on the determined speckle pattern. In one embodiment, an audio producer may produce a sound near the location. Near a location may include at sufficient proximity such that a sound emitted by the sound producer may cause a change in the speckle pattern. Near a location, therefore, may be different depending on the size of the sound producer.

In one example, the sound producer may produce a sound at or near the location. The detection module 140 may detect sound at the location, as previously described. The sound module 160 may compare the generated sound at the sound producer with the detected sound. In response to there being insufficient sound at the location, the sound module 160 may increase a volume for the sound producer. In another example, the sound module 160 may adjust a gain for the sound producer. Of course, the sound module 160 may adjust a sound producer in any way as one skilled in the art may appreciate, and this disclosure is meant to include all such ways.

In another example, the sound module 160 may compare sound from the sound producer with the detected sound. In response to there being little sound detected at the location, the sound module 160 may indicate that the sound producer may not be generating sufficient sound. In one example, the detected sound may be less than ½ the volume of an expected sound from the sound producer. In this example, the sound module 160 may indicate that the sound producer may not be performing adequately.

In another example, the sound module may determine that sounds at the location may be inconsistent with sound being produced by the sound producer. In response, the sound module 160 may indicate the presence of other sounds and may not make adjustments to the sound producer until the other sounds have ceased.

In another example, the detection module 140 may not detect any sound at the location and the sound module 160 may increase a volume of a sound producer. In another example, the sound module 160 may adjust phase of one or more sound producers.

In one embodiment, the sound module may operate two sound producers. In response to the location module determining a location for measuring sound, and the detection module 140 detecting sound at the location, the sound module 160 may determine that sound from one sound producer may be out of phase with another sound producer. Therefore, the sound module 160 may adjust phase of one of the speakers to correct the phase condition.

In another example, the sound module 160 may determine that sound from one of the sound producers may have a higher amplitude that sound from another of the sound producers. The sound module 160 may adjust an amplitude for one of the sound producers so that respective amplitudes of the two sound producers are substantially similar. Therefore, the sound module 160 may balance two or more sound producers. As described herein, volume and amplitude may be used interchangeably and may indicate a magnitude of a sound wave, or the like.

In another embodiment, the sound module 160 may determine, based on a volume of the detected sound, that sound from a sound producer may not be directed at the location. In response, the sound module 160 may change a direction of the sound producer to be directed at the location.

In one embodiment, the sound module 160 may determine that sound detected at the location may be imbalanced because magnitudes for higher frequency sounds may be higher than magnitudes for lower frequency sounds. Accordingly, the sound module 160 may balance a sound from a sound producer so that sounds at higher frequencies may be at a similar amplitude as sounds at lower frequencies. Of course, the sound module 160 may adjust balance of a sound signal in other ways as one skilled in the art may appreciate.

In one example, the sound producers may include speakers operating as part of a sound system in a room for media presentations. For example, a sound system may include 6 speakers in a 5.1 format as one skilled in the art may appreciate. The sound module 160 may balance sound from respective speakers, may direct one or more speakers at a location, may adjust any of the speakers in any other way as described herein, or in other ways as one skilled in the art may appreciate.

In one embodiment, the sound module 160 may adjusts the sound producer in response to an event selected from the group consisting of a change in volume, beginning playback of media content, a change in one or more of the locations, a change in one or more sound producers, and a command from a user.

In one example, the sound module 160 may adjust the sound producer in response to a user changing a volume for the sound producer. In another example, the sound module 160 may adjust the sound producers in response to a user beginning playback of media content. For example, in response to a use starting a movie, the sound module 160 may adjust the sound producer.

In another example, the sound module 160 may adjust the sound producer in response to a change in one or more of the locations. For example, a viewer of the media content may have been identified by the location module 120. The viewer may move from one location to another. In response, the detection module 140 may detect sound at the new location, and the sound module 160 may adjust a sound producer based on the detected sounds at the new location.

In another embodiment, the sound module 160 may adjust the sound producer beyond a threshold value. For example, a threshold value may be a maximum amplitude. In response to the sound module 160 adjusting the sound producer above the maximum amplitude, the sound module 160 may indicate that the sound producer has been adjusted outside of the threshold value. Of course, other threshold values may be used and this disclosure is not limited in this regard. For example, a threshold value may include, but is not limited to, a maximum volume, a minimum volume, a balance differential, a phase degree value, a minimum physical angle, a maximum physical direction, or other, or the like.

In one embodiment, two sound producers may emit a similar tone. The detection module 140 may detect a sound at the location. In response to the respective tones canceling each other out (being out of phase), the sound module 160 may adjust a phase of one of the sound producers to correct the phase.

In one embodiment, the respective modules may perform their functions as described herein in response to a command from a user. In one example, the apparatus may include a button, when pressed by a user, cause the location module to identify a location, the detection module to determine the speckle pattern, and the sound module 160 to adjust a sound producer accordingly.

In another embodiment, the respective modules may perform their functions continuously. In one example, the location module 120 may determine one or more locations for measuring sound repeatedly, periodically, continuously, or other, or the like. Accordingly, the detection module 140 may detect the speckle pattern at similar intervals, continuously, similarly, or the like. In one example, the modules may perform their functions at regular intervals, such as, but not limited to, every 10 seconds.

In one embodiment, the modules may perform their functions at convenient times. For example, a convenient time may be when a calibration signals is transmitted by one or more sound producers. In another example, a convenient time may include the absence of other sounds not produced by the sound producers. In another example, a convenient time may include a change in volume for media content being presented. In another example, in a system that includes more than one sound producer, in response to only one of the sound producers generating sound, the modules may perform their respective functions for the one sound producers (without interference from other sound producers).

In another embodiment, the sound module 160 may notify a user in response to any of the conditions described herein. In one example, the sound module may notify the user in response to adjusting a sound producer beyond a threshold value. In another example, the sound module 160 may notify the user in response to detecting interrupting sounds (i.e. sounds not produced from one of the sound producers). In another example, the sound module 160 may notify a user in response to detecting a failing speaker. Detecting a failing speaker may include adjusting a volume for the speaker beyond a threshold value, or beyond a maximum value for the speaker.

In another example, the sound module 160 may notify a user in response to sound quality problems with the sound producer. For example, where a detected sound by the detection module 140 is significantly different from a sound generated by the sound producer, the sound module 160 may determine that the speaker has a quality defect, or other, or the like. In one example, where the detected sound includes 50% or less of the sound produced by the sound producer, the sound module 160 may determine that the sound producer is failing.

In another example, the sound module 160 may determine that a sound producer is connected backwards (i.e. two wires that transmit a sound to the sound producer may be connected on incorrect terminals for the sound producer). In response to the detection module 140 detecting a sound that is 180 degrees out of phase, the sound module 160 may notify the user that the sound producer may be connected incorrectly.

Figure 2:
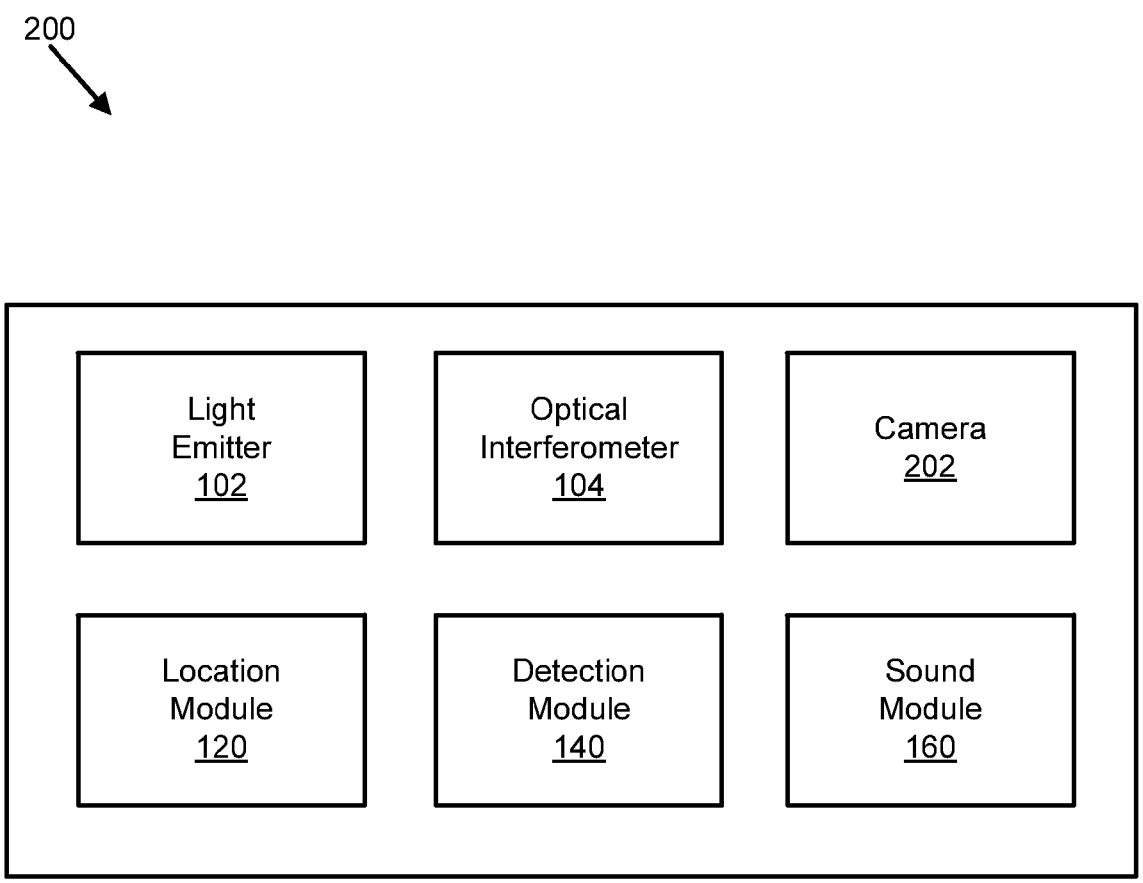
FIG. 2 is a schematic block diagram illustrating one embodiment of an apparatus for managing a sound system.

FIG. 2 is a schematic block diagram illustrating one embodiment of an apparatus for managing a sound system. In one embodiment, an apparatus 200 may include the light emitter 102, the optical interferometer 104, the location module 120, the detection module 140, the sound module 160, and a camera 202. The light emitter 102, the optical interferometer, the location module 120, the detection module 140 and the sound module 160 may or may not be substantially similar to those depicted in FIG. 1.

In one embodiment, the apparatus 200 includes the camera 202. The location module 120 may receive imagery from the camera 202 in order to determine one or more locations as previously described. In one example, the camera 202 may be an infrared camera for detecting motion of objects near the apparatus 200. The location module 120 may determine a location based on the movement detected. In another example, the camera 202 may provide imagery for the location module 120 to detect faces of individuals as previously described. Therefore, in certain embodiments, the camera 202 may be any camera usable by the location module 120 to perform the functions described herein, and is not limited in this regard. The camera 202 may be any kind of camera as one skilled in the art may appreciate.

Figure 3:
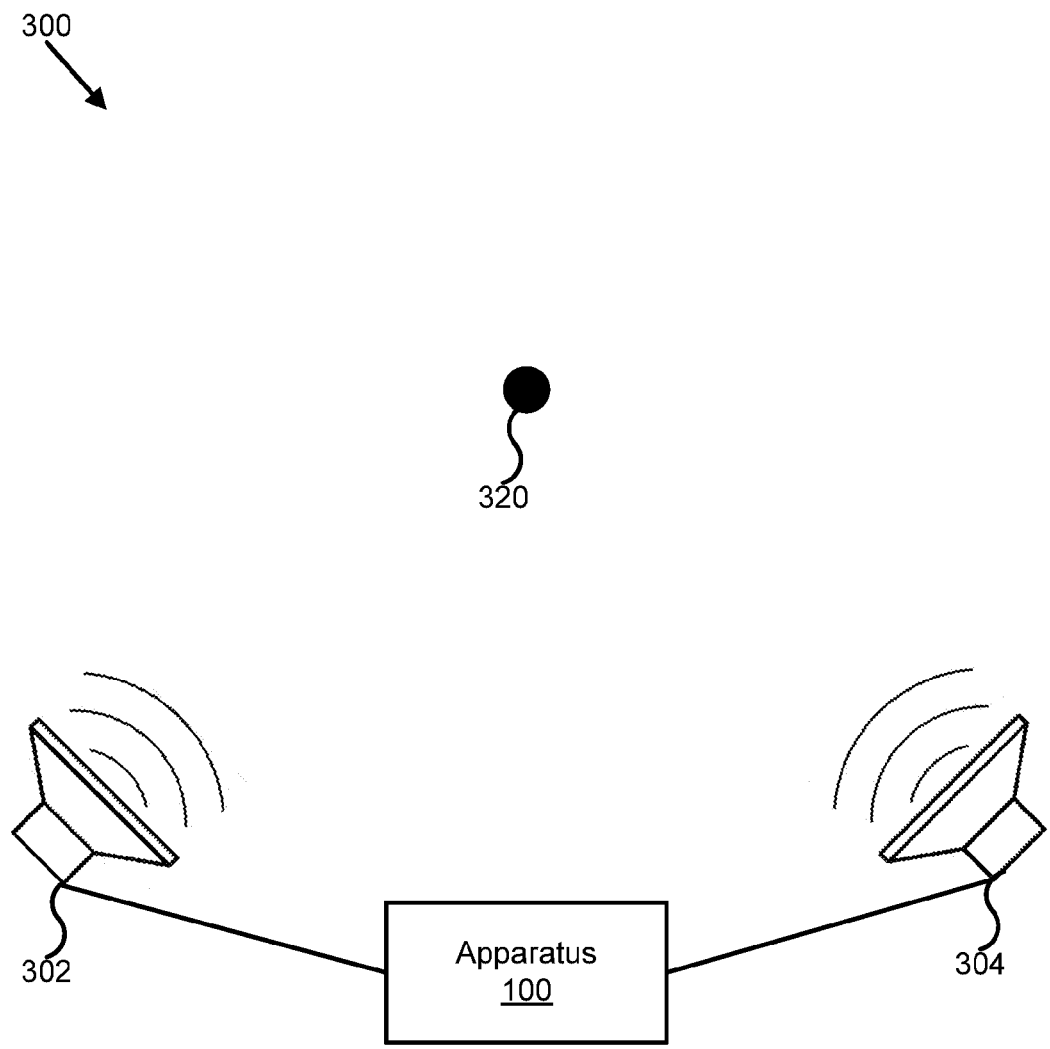
FIG. 3 is an illustration depicting one embodiment of a sound system in accordance with the present disclosure.

FIG. 3 is an illustration depicting one embodiment of a sound system in accordance with the present disclosure. In one embodiment, a system 300 may include the light emitter 102, the optical interferometer 104, a first sound producer 302, a second sound producer 304, the location module 120, the detection module 140, and the sound module 160. The light emitter 102, the optical interferometer 104, the location module 120, the detection module 140, and the sound module 160 may or may not be substantially similar to those depicted in FIG. 1.

In one embodiment, the sound module 160 may adjust the first sound producer 302 to balance with a second sound producer 304. For example, where the system may desire both the first sound producer 302 and the second sound producer 304 to produce similar sound levels at the location 320, the first sound producer 302 or the second sound producer 304 may produce a sound level that is not substantially similar to a sound level for the other sound producer. Therefore, a sound heard at location 320 may not be balanced because sound heard from one direction may be louder or quieter than sound heard from another location. The sound module 160 may adjust a sound level for either sound producer 302,304 to balance the sound with the other sound producer.

In one example, the system 300 may be a sound system for a room in a house or other building. The sound system may be for a media presentation. The location module may identify location 320 based on a person being at the location 320. The detection module may detect a movement of a speckle pattern at the location 320, and the sound module may adjust one of the speakers 302,304 accordingly, as described herein. Therefore, because the system may adjust the speakers 302,304 based on a location of a viewer of the presentation, the user may experience better quality sound. Furthermore, as the person may move about the room, the system may adjust the speakers accordingly. A system as described herein may provide a higher quality of sound for the person regardless of where the person may move within a range of the system 300.

In one example, the system 300 may adjust the speakers 302,304 in response to a user adjust a volume for the sound system 300. In another example, the system may adjust the speakers 302,304 in response to a user beginning playback of media content. In another example, the system 300 may adjust one of the speakers 302,304 in response to the person moving from one location to another. In another example, the system 300 may adjust one of the speakers 302,304 in response to the user issuing a calibration command at the apparatus 100.

In one example, the detection module may detect that sound producer 302 and sound producer 304 may be out of phase and the sound module 160 may adjust one of the sound producers 302,304 to bring them into phase.

In another example, the detection module may detect that either sound producer 302 and/or sound producer 304 may not be directed at the location 320. In response, the sound module 160 may change a direction for one of the sound producer 302 and the sound producer 304. Directing the sound producers 302,304 at a specific location 320 may enhance the quality of sound heard at the location 320.

Figure 4:
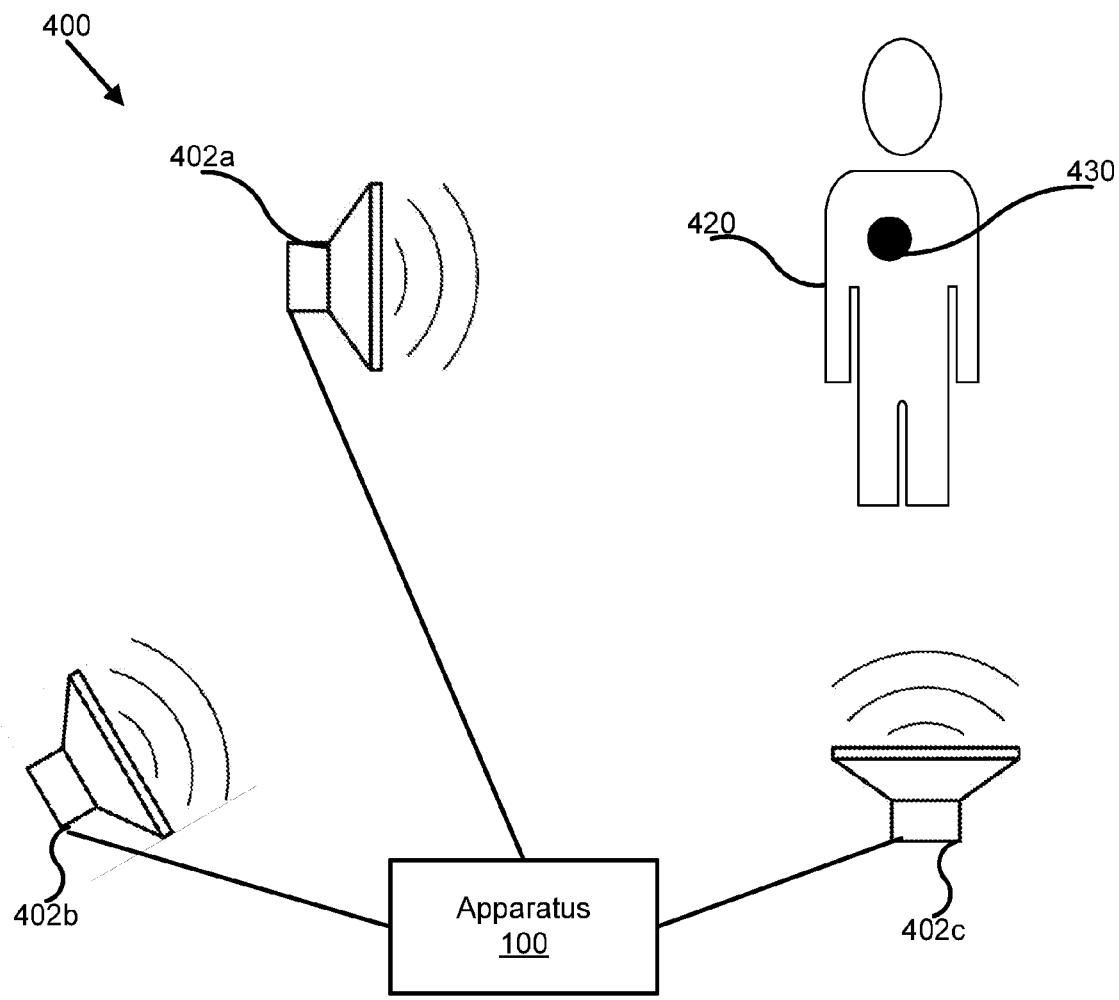
FIG. 4 is an illustration depicting one embodiment of a sound system in accordance with the present disclosure.

FIG. 4 is an illustration depicting one embodiment of a sound system in accordance with the present disclosure. In one embodiment, the system 400 may include the apparatus 100, and three sound producers 402. The sound producers may be arranged in any configuration as one skilled in the art may appreciate.

In one embodiment, the location module 120 may identify a person 420 at location 430. Based on independent sounds being generated at different sound producers, the detection module may detect that sound producer 402a and sound producer 402b may be at similar volumes, but sound producer 402c may not be at a similar volume. The sound module 160 may adjust a volume for sound producer 402c to be more consistent with sound levels generated at the other sound producers 402a,402b.

In one example, the location module 120 may determine a location 430 at a person 420 and the sound module 160 may determine that sound producer 402b may be further away from the location 430 than other sound producers 402a, 402c. In response, the sound module may adjust a phase, or a volume for sound producer 402 to compensate for the increase distance. Therefore, a person 420 at location 430 may experience similar amplitudes for speakers 402 that may be at different distances from the user.

Figure 5:
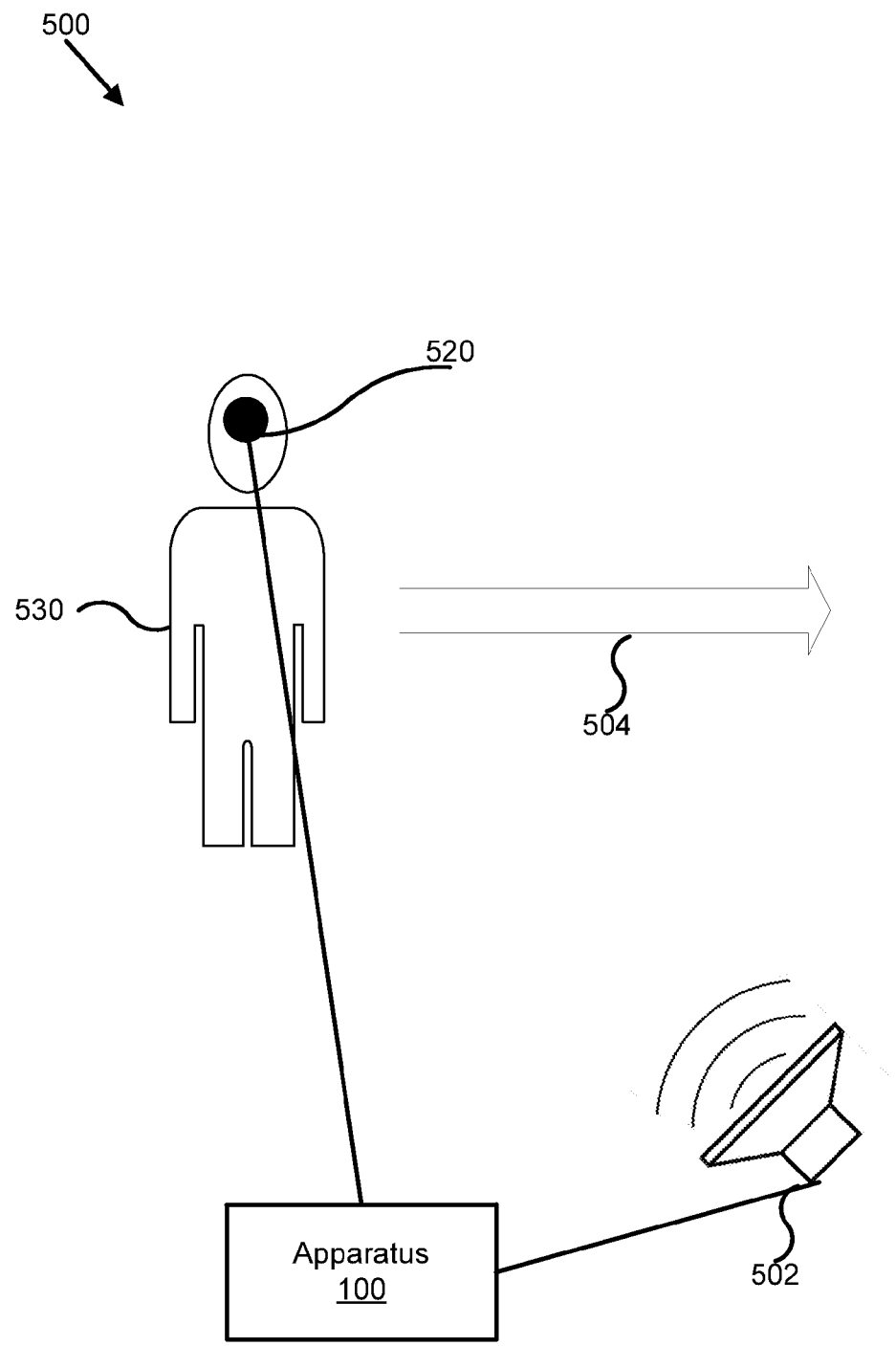
FIG. 5 is an illustration depicting one embodiment of a sound system in accordance with the present disclosure.

FIG. 5 is an illustration depicting one embodiment of a sound system in accordance with the present disclosure. In one embodiment, the system 500 may include the apparatus 100 and a sound producer 502. The location module 120 may direct the light emitter 102 to a forehead 520 of the user 530. The detection module 140 may detect sound at the location 520 and the sound module 160 may adjust the sound producer 502 as described herein.

In one example, the user may be moving along a path 504. In response to the motion of the person 530, the respective modules may perform their functions to calibrate sound being generated by the sound system. Such adjustments may optimize sound heard by the person 530. Therefore, as the person 530 moves around the system 500 may constantly adjust sound generated at the sound producer 502. For example, the sound module 160 may adjust a direction of the sound producer to be aimed at the location 520.

In another embodiment of the system 500, the system may include many sound producers. As described herein, the system 500 may adjust the many sound producers as the person moves along the movement path 504. The system may consistently update sound volume, balance, phase, or other, or the like, so that the person 530 may experience optimal sound quality regardless of where the user may be.

Figure 6A:
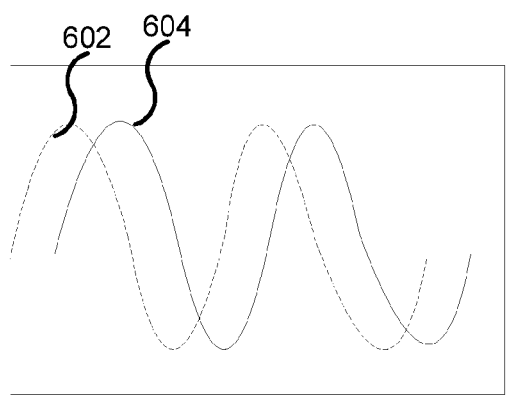
FIG. 6A is an illustration depicting sound patterns in accordance with one embodiment of the present disclosure.

FIG. 6A is an illustration depicting sound patterns in accordance with one embodiment of the present disclosure. In one embodiment, a sound signal from one sound producers may be depicted by wave 602 and a sound signal from another sound producer may be depicted by wave 604. Wave 602 and wave 604 may be out of phase and may partially diminish sound quality heard at the location.

Figure 6B:
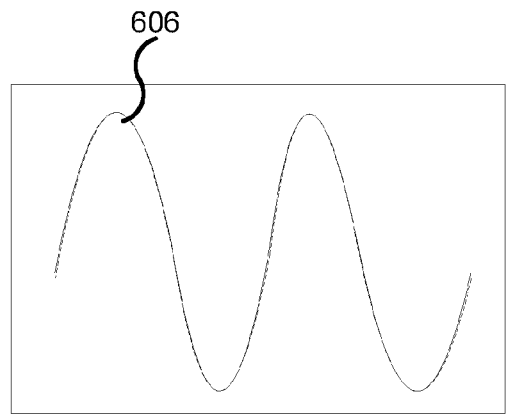
FIG. 6B is an illustration depicting sound patterns in accordance with one embodiment of the present disclosure.

FIG. 6B is an illustration depicting sound patterns in accordance with one embodiment of the present disclosure. In response to wave 602 and wave 604 being out of phase, the sound module 160 may adjust phase for one of the sound producers so that waves 602 and 604 may be in phase as depicted in FIG. 6B. A resulting sound signal detected at the location may be depicted by wave 606 (a combination of waves 602 and 604 that are now in phase).

Figure 6C:
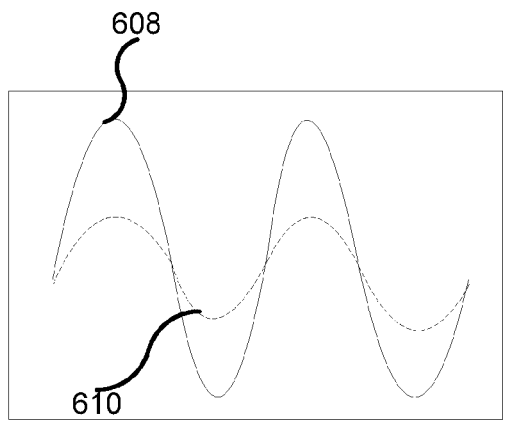
FIG. 6C is an illustration depicting sound patterns in accordance with one embodiment of the present disclosure.

FIG. 6C is an illustration depicting sound patterns in accordance with one embodiment of the present disclosure. In one embodiment, a sound signal from one sound producers may be depicted by wave 608 and a sound signal from another sound producer may be depicted by wave 610. Wave 608 and wave 610 may be at different volumes or magnitudes. This may result in the sounds from one sound producer not being balanced with sounds from another sound producer.

Figure 6D:
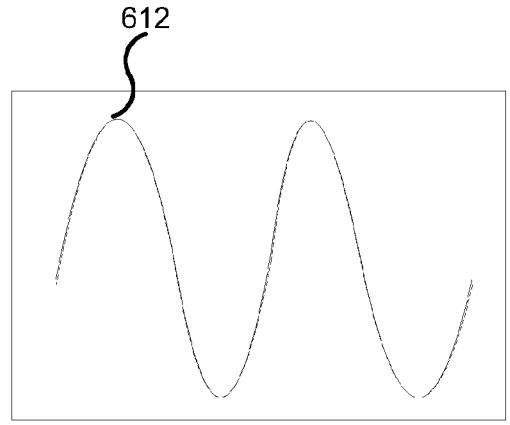
FIG. 6D is an illustration depicting sound patterns in accordance with one embodiment of the present disclosure.

FIG. 6D is an illustration depicting sound patterns in accordance with one embodiment of the present disclosure. In response to waves 608 and 610 being at different amplitudes, the sound module 160 may adjust volume for one of the sound producers so that waves 608 and 610 may be at similar amplitudes. This may result in a cooperative wave 612 that includes waves 608 and 610 at similar volumes.

Figure 7:
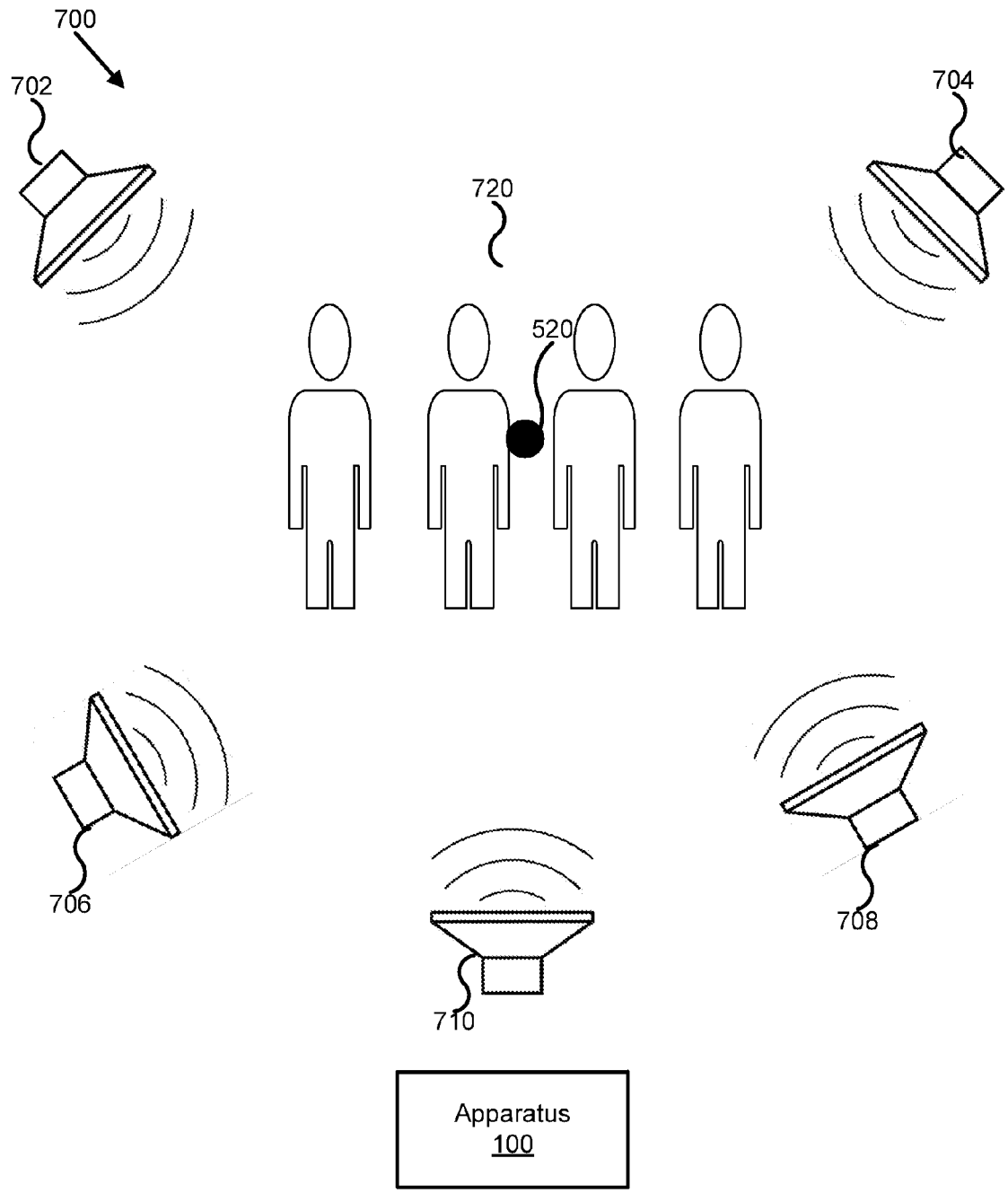
FIG. 7 is an illustration depicting one embodiment of a sound system in accordance with the present disclosure.

FIG. 7 is an illustration depicting one embodiment of a sound system in accordance with the present disclosure. In one embodiment, the system 700 may include the apparatus 100 and 5 sound producers 702, 704, 706, 708, 710, and 712. The sound producers may be configured consistent with a 5.1 six channel surround sound multichannel audio system as one skilled in the art may appreciate.

The location module 120 may identify many persons 720 at or near the apparatus 100. In response to detecting many persons near the apparatus 100, the location module may determine a single location 520 for the persons. In another example, the location module 120 may identify the many persons 720 and may determine respective locations at each of the persons 720.

In certain embodiments, the detection module 140 may detect a movement of a speckle pattern at one or more of the locations and the sound module 160 may adjust the sound producers accordingly and as described herein. In another embodiment, where the location module 120 may detect many locations based on the people 520, the detection module 140 may average the many locations to derive a single location 520. The sound module 160 may adjust one or more of the sound producers 702, 704, 706, 708, 710 based, at least in part, on the derived location 520.

Figure 8:
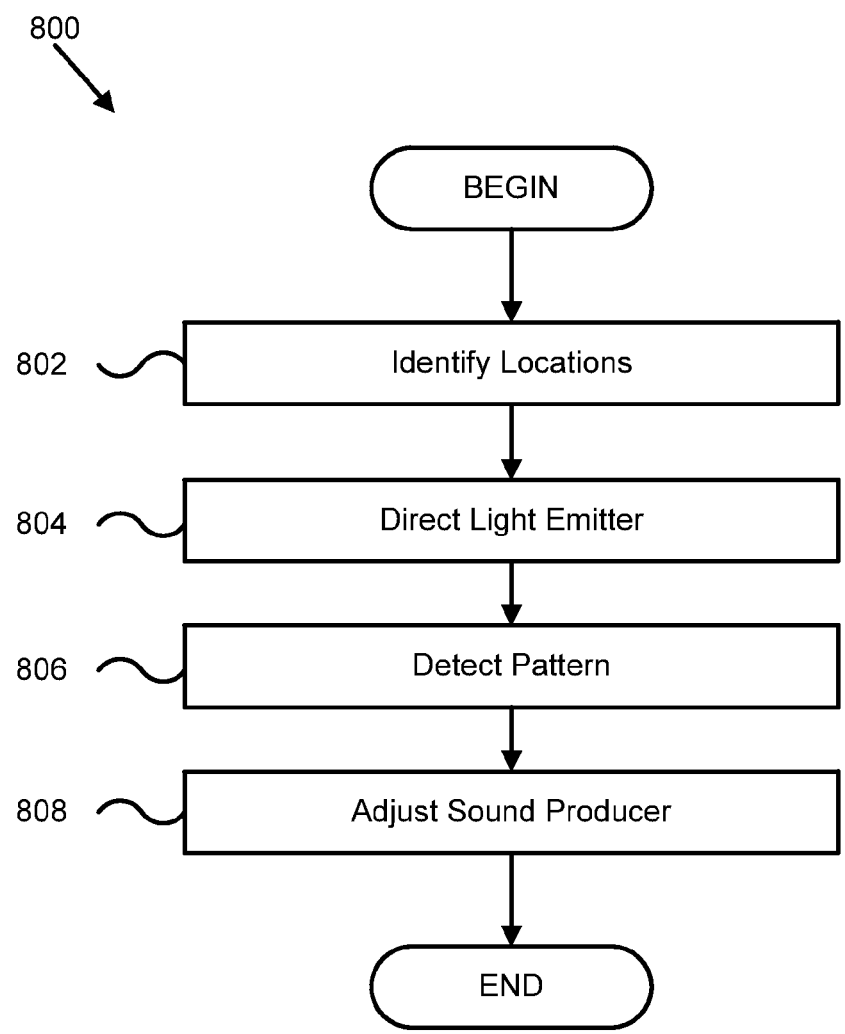
FIG. 8 is a schematic flow chart diagram illustrating one embodiment of a method for managing a sound system.

FIG. 8 is a schematic flow chart diagram illustrating one embodiment of a method 800 for managing a sound system. In one embodiment, the method 800 may begin and the location module 120 may identify 802 a location for measuring sound. The detection module 140 may direct 804 light from a light emitter to the location. The detection module 140 may determine 806 a speckle pattern at the location based on data received by an optical interferometer. The sound module 160 may adjust 808 a sound producer based on the determined speckle pattern and the method 800 may end.

In another embodiment of the method 800, adjusting the sound producer may be as part of adjusting two or more sound producers to balance a sound level measured at the location. In another embodiment, the two or more sound producers operate as part of a sound system in a room for media presentations. In one embodiment, the identifying may include identifying a person at the location.

Figure 9:
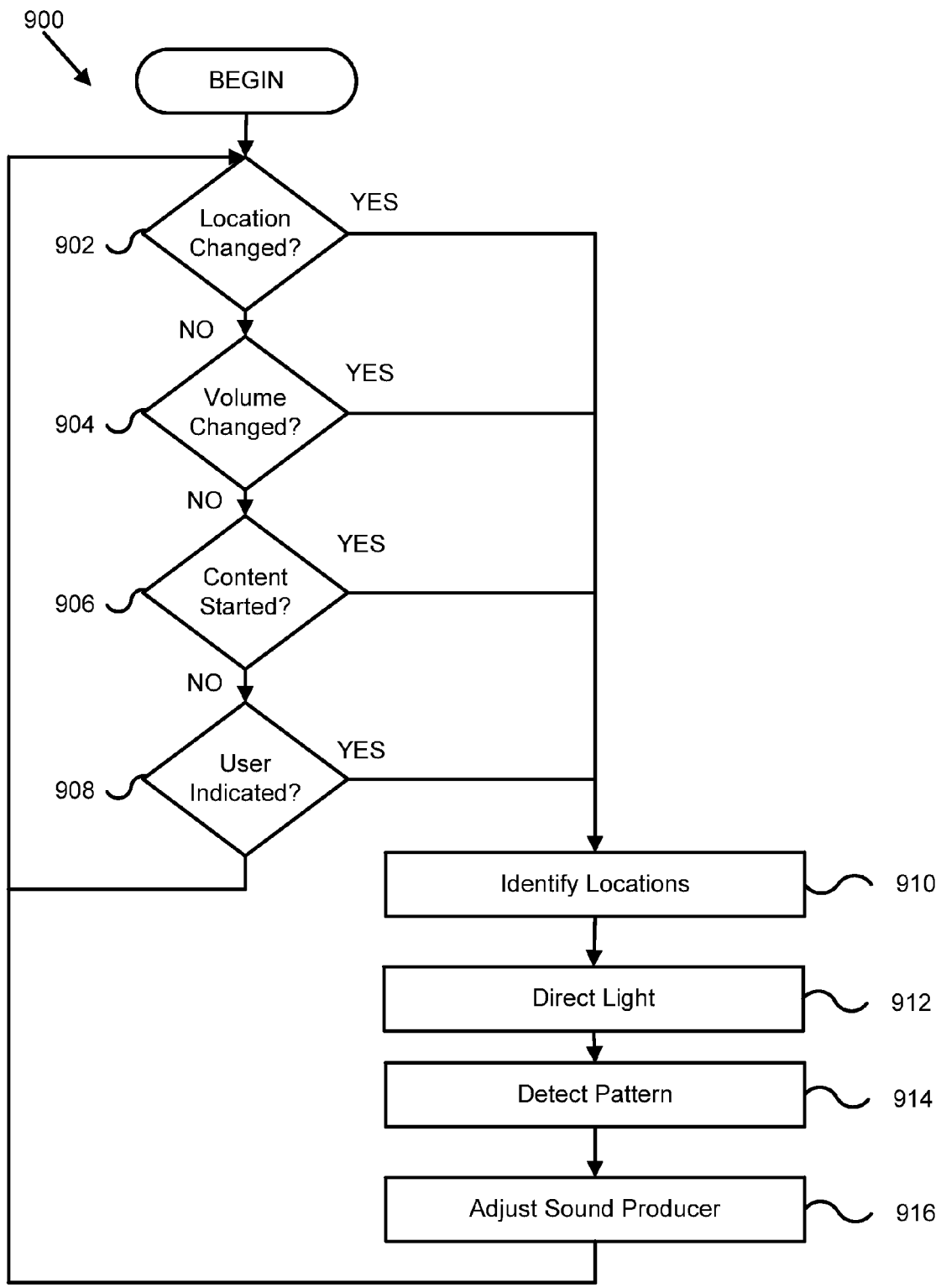
FIG. 9 is a schematic flow chart diagram illustrating one embodiment of a method for managing a sound system.

FIG. 9 is a schematic flow chart diagram illustrating one embodiment of a method for managing a sound system. In one embodiment, the method 900 may begin and the location module 120 may determine 902 if a location changed. In response to the location changing, the method 900 may continue at block 910. If a location has not changed, the detection module 140 may determine 904 if a volume changed for one of the sound producers. In response to the volume changing, the method 900 may continue at block 910. If a volume has not changed, the detection module 140 may determine 906 if playback of media content has started. In response to playback for media content starting, the method 900 may continue at block 910. If playback of media content had not started, the detection module 140 may determine 908 if a user has indicated calibration of one or more sound producers. If not, the method may continue at block 920. If the user has indicated calibration of one or more sound producers, the method may continue at block 910 where the location module 120 may identify 910 one or more locations for measuring sound. The location module may direct 912 light from a light emitter 102 to one or more of the locations. The detection module 140 may detect 914 movement of a speckle pattern at one or more of the locations. The sound module 120 may adjust 916 one or more sound producers in response to the detected movement of the speckle pattern and the method may continue at block 902.

Therefore, in certain embodiments, adjusting a sound producer as described here may be in response to an event selected from the group consisting of a change in volume, beginning playback of media content, a change in one or more of the locations, a change in one or more sound producers, and a command from a user.

Figure 10:
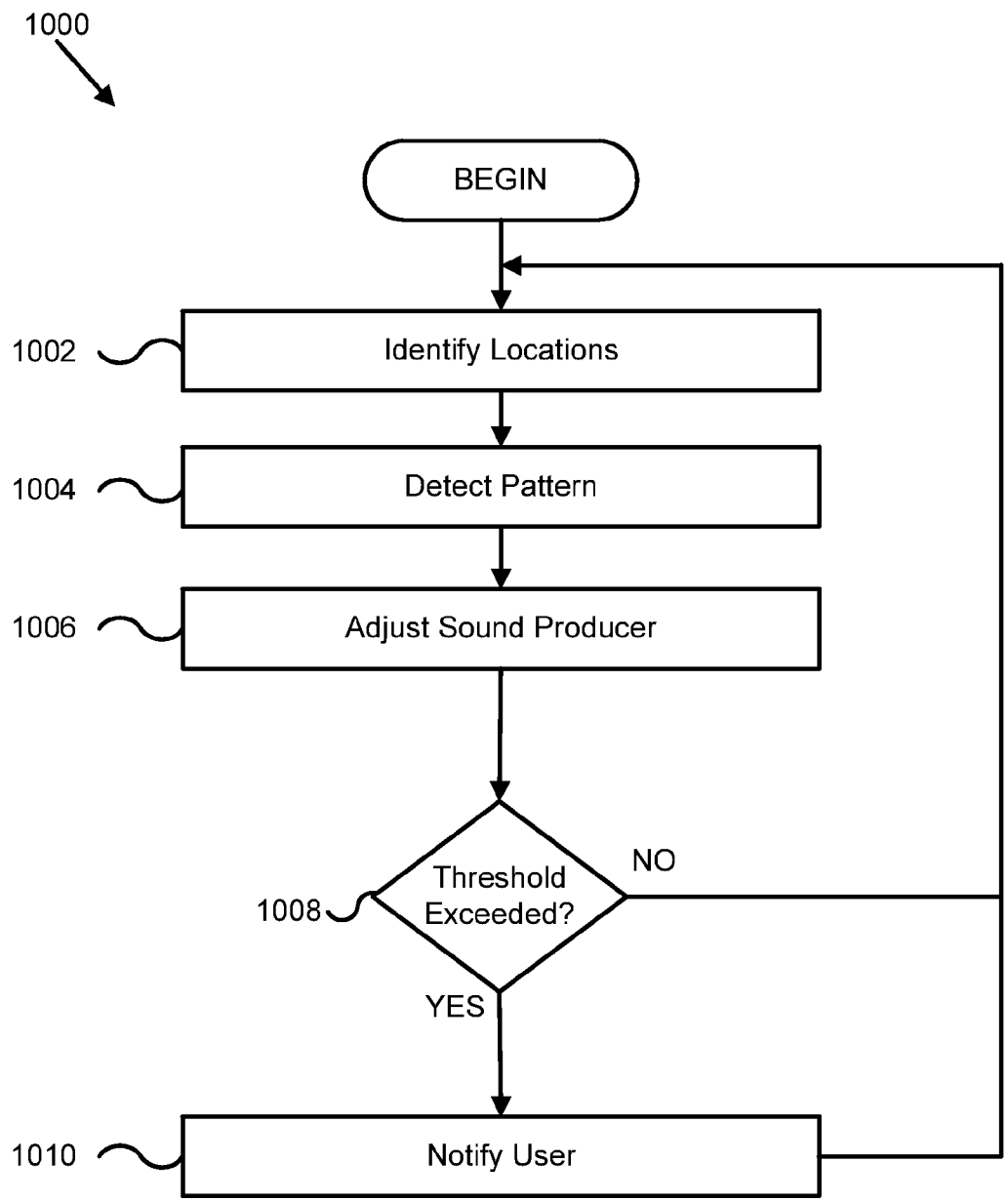
FIG. 10 is a schematic flow chart diagram illustrating one embodiment of a method for managing a sound system.

FIG. 10 is a schematic flow chart diagram illustrating one embodiment of a method for managing a sound system. In one embodiment, the method 1000 may begin and the location module 120 may identify 1002 one or more locations for measuring sound. The detection module 140 may detect 1004 a speckle pattern at one of the locations. The sound module 160 may adjust 1006 one or more sound producers based on the measured speckle patterns as described herein. The sound module 160 may determine 1008 if an adjustment exceeds a threshold value. If the adjustment does not exceed the threshold value the method may continue at block 1002. If the adjustment does exceed the threshold value the sound module 160 may notify 1010 a user and the method may continue and the method may continue at block 1002.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a light emitter;
an optical interferometer;
a processor;
a memory that stores code executable by the processor to:
identify a location for measuring sound and, direct light from the light emitter to the location;
determine a speckle pattern at the location based on data received by the optical interferometer;
compare the speckle pattern with a sound generated at a first sound producer;
adjust a sound producer based on the comparison of the determined speckle pattern and the sound generated at the first sound producer.

2. The apparatus of claim 1, further comprising code executable by the processor to adjust two or more sound producers to balance a sound level measured at the location.

3. The apparatus of claim 1, further comprising code executable by the processor to determine the location by identifying a person at the location.

4. The apparatus of claim 1, further comprising code executable by the processor to adjust the sound producer in response to an event selected from the group consisting of a change in volume, beginning playback of media content, a change in one or more of the locations, a change in one or more sound producers, and a command from a user.

5. The apparatus of claim 1, further comprising code executable by the processor to adjust the sound producer with a modification selected from the group consisting of phase, volume, direction, and balance.

6. The apparatus of claim 1, further comprising code executable by the processor to adjust two or more sound producers operating as part of a sound system in a room for media presentations.

7. The apparatus of claim 1, further comprising code executable by the processor to notify a user in response to adjusting a sound producer outside a threshold range.

8. A method comprising:
identifying a location for measuring sound;
directing light from a light emitter to the location;
determining a speckle pattern at the location based on data received by an optical interferometer;
comparing the speckle pattern with a sound generated at a first sound producer;
adjusting a sound producer based on the comparison of the determined speckle pattern and the sound generated at the first sound producer.

9. The method of claim 8, further comprising adjusting two or more sound producers to balance a sound level measured at the location.

10. The method of claim 9, wherein the two or more sound producers operate as part of a sound system in a room for media presentations.

11. The method of claim 8, wherein the identifying is based on identifying a person at the location.

12. The method of claim 8, wherein adjusting the sound producer is in response to an event selected from the group consisting of a change in volume, beginning playback of media content, a change in one or more of the locations, a change in one or more sound producers, and a command from a user.

13. The method of claim 8, wherein adjusting the sound producer comprises adjusting the sound producer with a modification selected from the group consisting of phase, volume, direction, and balance.

14. The method of claim 8, further comprising notifying a user in response to adjusting a sound producer outside a threshold range.

15. A system comprising:
a light emitter;
an optical interferometer;
one or more sound producers;
a processor;
a memory that stores code executable by the processor to:

identify a location for measuring sound and, direct light from the light emitter to the location;

determine a speckle pattern at the location based on data received by the optical interferometer;

compare the speckle pattern with a sound generated at at least one of the one or more sound producers;

adjust one of the one or more sound producers based on the comparison of the determined speckle pattern and the sound generated at the sound producer.

16. The system of claim 15, further comprising code executable by the processor to adjust two or more sound producers to balance a sound level measured at the location.

17. The system of claim 15, wherein the one or more sound producers operate as part of a sound system in a room for media presentations.

18. The system of claim 15, further comprising code executable by the processor to identify the location based on identifying a person at the location.

19. The system of claim 15, further comprising code executable by the processor to adjust the one or more sound producers in response to an event selected from the group consisting of a change in volume, beginning playback of media content, a change in one or more of the locations, a change in one or more sound producers, and a command from a user.

20. The system of claim 15, further comprising code executable by the processor to adjust the sound producer with a modification selected from the group consisting of phase, volume, direction, and balance.

\* \* \* \* \*